(12) United States Patent
Talupur

(10) Patent No.: US 12,190,045 B1
(45) Date of Patent: Jan. 7, 2025

(54) AUTOMATED ASSISTANT FOR ENHANCED PROOFREADING

(71) Applicant: Muralidhar Talupur, Beaverton, OR (US)

(72) Inventor: Muralidhar Talupur, Beaverton, OR (US)

(73) Assignee: Gitsy, Beaverton, OR (US)

( * ) Notice: Subject to any disclaimer, the term of this patent is extended or adjusted under 35 U.S.C. 154(b) by 0 days.

(21) Appl. No.: 17/729,819

(22) Filed: Apr. 26, 2022

Related U.S. Application Data

(60) Provisional application No. 63/188,860, filed on May 14, 2021.

(51) Int. Cl.
*G06F 40/151* (2020.01)
*G06F 7/76* (2006.01)
*G06F 40/166* (2020.01)

(52) U.S. Cl.
CPC .............. *G06F 40/151* (2020.01); *G06F 7/76* (2013.01); *G06F 40/166* (2020.01)

(58) Field of Classification Search
CPC ..................................................... G06F 40/151
See application file for complete search history.

(56) References Cited

U.S. PATENT DOCUMENTS

| | | | | |
|---|---|---|---|---|
| 6,085,206 A | * | 7/2000 | Domini et al. | G06F 17/21 |
| 6,128,633 A | * | 10/2000 | Michelman et al. | G06F 15/00 |
| 2006/0277332 A1 | * | 12/2006 | Yamashina | G06F 13/38 |
| 2006/0285746 A1 | * | 12/2006 | Yacoub et al. | G06K 9/34 |
| 2011/0313757 A1 | * | 12/2011 | Hoover et al. | G06F 17/27 |
| 2019/0305937 A1 | * | 10/2019 | Baykaner et al. | H04L 9/0637 |

* cited by examiner

*Primary Examiner* — James J Debrow
(74) *Attorney, Agent, or Firm* — Chernoff, Vilhauer, McClung & Stenzel LLP

(57) ABSTRACT

A system for automated enhancement of proofreading using transformations.

29 Claims, 3 Drawing Sheets

AUTOMATED ASSISTANT FOR ENHANCED PROOFREADING

CROSS REFERENCE TO RELATED APPLICATIONS

This application claims the benefit of U.S. Provisional Patent Application No. 63/188,860 filed May 14, 2021.

BACKGROUND

The subject matter of this application relates to enhanced proofreading.

Manual proofreading is the tried and tested way to improve our writing, be it simple text messages, technical papers, legal or professional documents. The process of manually proofreading has been supplemented by grammar checkers and spell checkers that assist with the identification of some mistakes, but tend to often miss obvious mistakes. Furthermore, the existing grammar checkers and spell checkers are of no assistance when it comes to stylistic issues. With these limitations, writers often spend considerable time proofreading documents multiple times, especially important documents, to attempt to identify mistakes and improve the quality of their writing. However, even with the use of existing grammar checkers and spell checkers together with considerable effort proofreading documents, mistakes still persist that the writer fails to identify.

What is desired is an assisted proofreading technique to identify mistakes.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Proofreading is an activity with diminishing returns with manually proofreading being supplemented by grammar checkers and spell checkers that assist with the identification of some mistakes. One of the principal reasons for the diminishing returns is that the text becomes more familiar with repeatedly reviewing the text, and the writer tends to pass less attention to the particular words by skipping over words and even some sentences. Furthermore, even after manually proofreading being supplemented by grammar checkers and spell checkers, the writer is not sure how well the proofreading has been done and how many mistakes may still be lurking within the text. To increase the proofreading accuracy, writers have taken to come up with proofreading tricks such as taking a break then continuing to proofread, proofreading a printed form on paper rather than a computer screen, and changing the font size so that the text looks fresh again. To further increase the proofreading accuracy, writers have even elected to read the document from the bottom up to break the flow.

Figure 1:
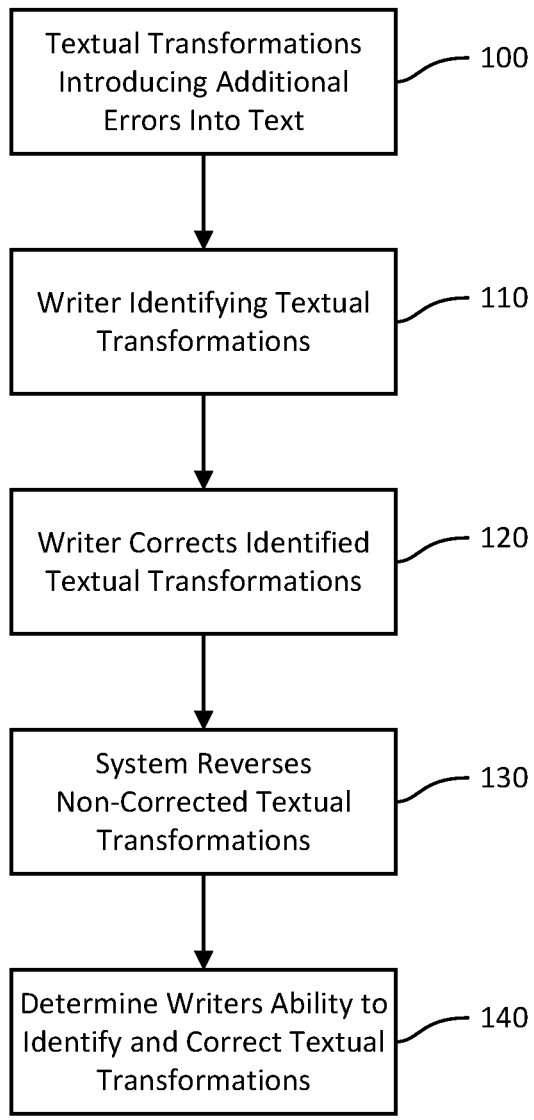
FIG. 1 illustrates a system for textual transformations.

Referring to FIG. 1, in contrast to the use of an incremental set of techniques to attempt to incrementally remove errors from the text, it is desirable to include a computer assisted proofreading assistant that introduces textual transformations with additional errors into the text 100. Preferably, the textual transformations are made into an electronic document which may be viewed on a display. The introduction of textual transformations, either as a single transformation, a series of single transformations, or a combination of transformations, results in the writer paying more attention to the writing, while at the same causing the review process to be more engaging to identify the transformation(s) 110 in any suitable manner. The writer then corrects the textual transformations using an editor. The system then may reverse the remaining non-contact textual transformations, while leaving the writers edits in the text 130. Furthermore, by determining the ability of the writer to identify the transformations, a metric may be determined that provides actionable feedback to the writer in the ability to identify transformations 140.

Figure 2:
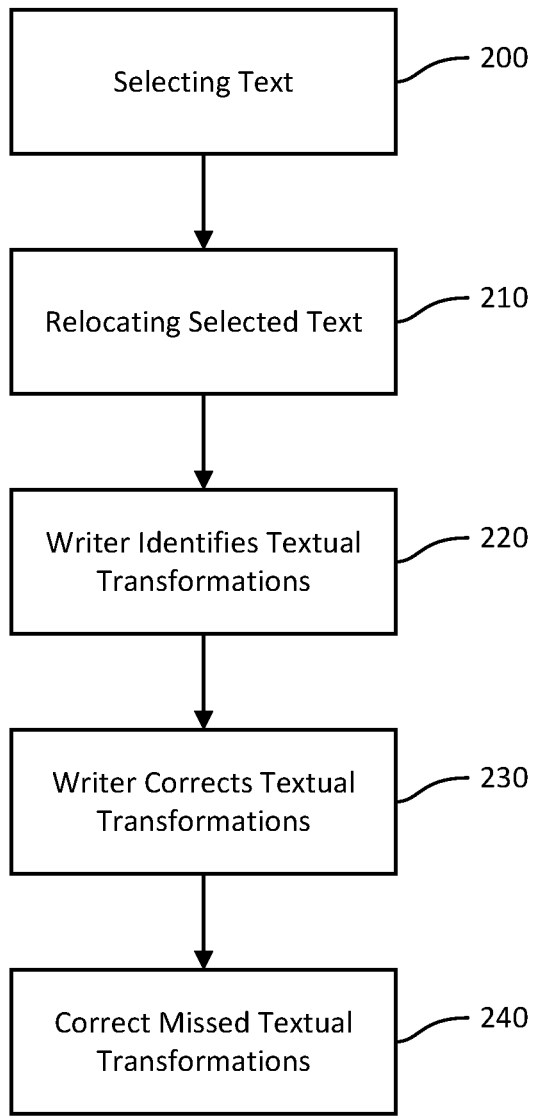
FIG. 2 illustrates a system for relocating transformations.

Referring to FIG. 2, one textual transformation may include the computing device selecting single words of the text, selecting multiple words of the text, or otherwise a series of continuous words of the text 200. The selected text is then relocated within the same sentence, relocated within a different sentence, and/or an entire sentence is related between a pair of other sentences 210. The writer then proofreads the text and identifies the textual transformations 220. The writer then revises the text to correct the textual transformations 230. After the writer has completed revising the text, the computing device identifies any missed textual transformations to the writer, which the writer either corrects or otherwise the system automatically reverses the remaining textual transformations 240. This facilitates the writer identifying the textual transformations which assists in potentially identifying other writing errors that are likewise corrected in the process to otherwise improve the proofreading results.

The textual transformation may be performed at multiple levels of granularity, which may be selected automatically by the computer system, or by the writer, if desired.

For exposing spelling mistakes, words within a sentence may be shuffled. For example, the previous sentence would be shuffled as "exposing For mistakes shuffled can be within a sentence words spelling.". This tends to force the writer to focus on each word. It tends to be very slow for the writer to modify the sentences to remove most of the textual transformations, but this increases the likelihood of the correction of the mistakes.

For grammar mistakes, sentences within a paragraph may be shuffled. So, if a paragraph has three sentences say (S1, S2, S3) in that order the system may automatically rearrange them to be in another order, say (S2, S1, S3). This would force the writer to pay attention to each sentence individually as they have to read it in a different context to identify and correct the textual transformations.

For higher level stylistic issues, whole paragraphs themselves may be shuffled around. This tends to break the flow of ideas, cause the writer pay attention to each paragraph in isolation, and cause the writer to think anew about their document.

The text shuffling transformation retains a mapping of shuffled text back to the original text and once the writer has fixed the text, it will rearrange the remaining shuffled text back into original arrangement while retaining any updates made by the writer.

Figure 3:
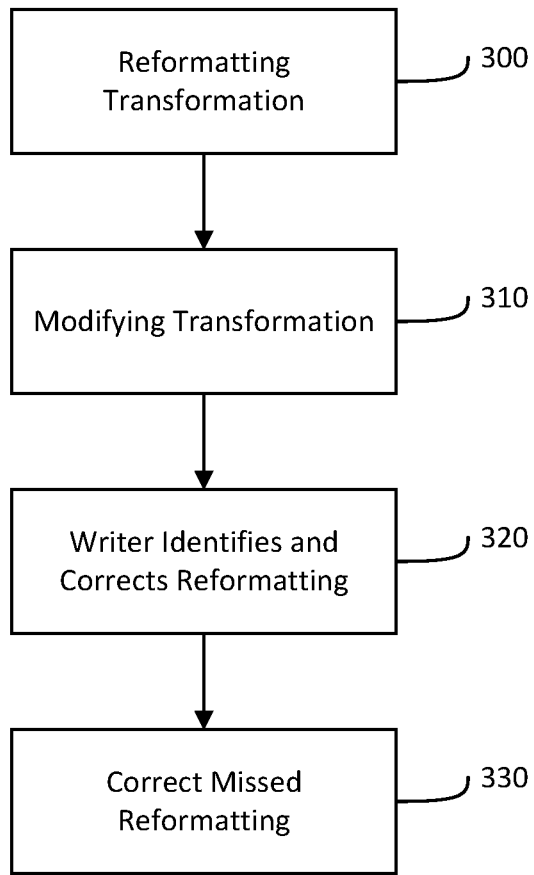
FIG. 3 illustrates a system for reformatting transformations.

Referring to FIG. 3, another textual transformation may include the computing device performing textual reformatting transformations 300. Textual reformatting transformations is similar in spirit to text shuffling. Textual reformatting transformations may add and/or remove line breaks, page breaks, spaces, change the text format, and other formatting to present the text in a manner that is less familiar to the writer 310. The writer then attempts to identify the reformatting transformations and put the textual content back in the proper format, and in the process likely corrects other textual formatting issues that existed in the original text 320. The computer system also maintains a reverse transform 330 so that once the writer is done updating the text it will be rearranged back to the original formatting or as close to it as possible while retaining the updates included by the writer.

When using this transform the user should only fix reformatting but not try to change spelling and grammatical mistakes.

The effectiveness of proofreading process can be improved by mutating the original text and challenging the writer to figure out the mutations or errors that are introduced. This transformation will maintain the errors it has introduced and once the writer is done identifying and correcting, it will highlight all those errors that haven't been caught. The act of catching seeded errors will "gamify" the proofreading process: as they catch errors writers will get positive reinforcement to look carefully for more errors and the score at the end of total bugs found will serve as an indication of how effective they were.

Errors can be seeded using different techniques with varying levels of sophistication. For instance, among various possibilities may include one or more of the following:

Change spelling of words by introducing/dropping random letters. For example, change "apple" to "aple". The transform preferably doesn't try to understand the words and does a naive error seeding. To use this transform users preferably turn off the built-in spell checkers.

Change words by introducing other words with similar function. For example, change "apple" to "orange" or change "place" to "palace" or change "spring" to "autumn" or change singular to plural, and so on. That is, the transform tries to understand the words whether it is a verb or a noun, its synonyms, antonyms etc. to introduce subtle errors.

Introduce or drop random words in the text preferably without trying to understand the grammatical structure. For example, change "Boys are playing basketball" to "Boys are girls playing basketball". Another change could be "Boys playing basketball".

Understand the grammar and introduce subtle errors. For example, change "Boys are playing basketball" to "Girls are playing basketball" or "Boys is playing basketball". Or change "It is spring" to "It was spring". More challengingly introduce multiple subtle errors. For example, change the sentence "Interestingly we can see similar variations in the bee population" to "Interesting we can see similar variations in bee population". Many of these errors will not be caught by grammar checkers.

These are just examples of some transformations and these can be used either singly and/or in combination. The system may include a selection to indicate how aggressively it should introduce errors and if it should combine the different transformations. As an example, while shuffling paragraphs it would make sense to shuffle paragraph number 1 to position 5 but not make it paragraph 20 as that might lead to too much loss of context. Similarly, while mutating texts it would make sense to introduce at most 1 or 2 errors in a sentence otherwise there will be too many corrections to make and cause writer fatigue.

The different transforms can be combined to make them even more effective. For example, text shuffling at paragraph level along with text mutating might be more effective than either one alone.

The system may be used for a variety of different tasks, including for example, proofreading emails, blog posts, professional documents, legal documents, technical papers, and so on.

The system may be realized in several ways: it can be available as a plug-in to browsers such as Chrome, Explorer, email clients such as Outlook, text editors such as Word, Pages, Emacs. It can be available as an additional service in blog creating sites such as a WordPress or Substack. It can be available in website creating services such as GoDaddy. It can be incorporated in social media apps such as Twitter, Facebook, and in instant messaging apps such as Slack. In short, any program or service that is used for creating text content may benefit from the system.

The system may be realized as a stand-alone program that takes a text and returns a transformed text along with an inverse mapping. If the transformed text along with any corrections and inverse mapping is fed to the system, it will return a text close to the original text. As long as the user fixes only spelling and grammatical mistakes and doesn't drastically alter the formatting or arrangement of text they will get back the original document with the fixes added.

The system is not limited to any particular language. The text transforms in the system may be customized to different languages and thus it can potentially help almost everyone in the world who writes using computers.

The computer system may be instantiated even for computer languages used for writing hardware or software. In specific the idea of mutating the text/code and challenging the user to find the errors can be used to make the manual code review process more effective. For this the computer system may have to understand the code syntax and introduce errors that will not be caught easily either by static tools built into code editors or by the code compiler. One way to do this is to replace a term in the code with another term of similar type that is available in the same code context. The term could be a variable or a constant and this mutation will force the coder to think carefully again.

In current hardware and/or software development it is common to have peer review of code. But this process is ad-hoc with the quality of review varying wildly from person to person. With an automated assistant like the computer system described herein, the system may quickly introduce subtle errors to raise the bar on the code reviews. For such use cases the computer system can be available on code sharing/hosting services, such as GitHub. It may also be realized as an extension for editors such as VS Code or IntelliJ Idea for individual use.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

I claim:

1. A method for textual transformation using a computer that includes a processor, comprising the steps of:
    (a) receiving a textual document in a digital format having a first content having a first organization;
    (b) said computer performing a textual transformation of said first content having said first organization to a second organization on said textual document to introduce errors into said textual document of said first content in such a manner that said first organization of said first content is modified to said second organization;
    (c) said computer receiving modifications by a writer of modifications to said second organization of said first content of said textual document to reverse at least a part of said textual transformation to include at least part of said first organization;
    (d) said computer automatically identifying remaining textual transformations of said second organization that would result in said first organization and reversing said remaining textual transformations not modified as a result of receiving said modifications by said writer such that said textual document results in having said first organization and applying said remaining textual transformations to said textual document resulting in said textual document having said first content having said first organization.

2. The method of claim 1 wherein said textual transformation includes changing an arrangement of at least one of words, sentences, and paragraphs in said textual document.

3. The method of claim 1 wherein said reversing preserves receiving modifications by said writer of said textual document that does not reverse at least a part of said textual transformation.

4. The method of claim 1 wherein said introduced errors into said textual document is based upon either a shallow or deep understanding of a grammatical structure of said textual document.

5. The method of claim 1 further comprising presenting said remaining textual transformations to said writer.

6. The method of claim 1 wherein said textual transformation includes relocation of a plurality of individual words.

7. The method of claim 1 wherein said textual transformation includes relocation of a plurality of individual letters of individual words.

8. The method of claim 1 wherein said textual transformation includes relocation of a plurality of individual sentences.

9. The method of claim 1 wherein said textual transformation includes relocation of a plurality of individual paragraphs.

10. The method of claim 1 wherein said textual transformation includes modification of formatting.

11. The method of claim 1 wherein said textual transformation includes modification of line breaks.

12. The method of claim 1 wherein said textual transformation includes modification of page breaks.

13. The method of claim 1 wherein said textual transformation includes modification of spaces.

14. The method of claim 1 wherein said textual transformation includes modification of text format.

15. The method of claim 1 wherein said textual transformation includes changing a spelling of a word from a proper spelling to an improper spelling.

16. A method for textual transformation using a computer that includes a processor, comprising the steps of:
    (a) receiving a textual document in a digital format having a first content having a first organization;
    (b) said computer performing a textual transformation of said first content having said first organization to a second organization on said textual document to introduce errors into said textual document of said first content in such a manner that said first organization of said first content is modified to said second organization;
    (c) said computer receiving modifications by a writer of modifications to said second organization of said first content of said textual document to reverse at least a part of said textual transformation to include at least part of said first organization;
    (d) said computer automatically identifying an additional textual transformation of said second organization that would result in at least a part of said first organization and reversing said additional textual transformation not modified as a result of receiving said modifications by said writer such that said textual document results in having said at least a part of said first organization and applying said additional textual transformations to said textual document resulting in said textual document having said first content having said first organization.

17. The method of claim 16 wherein said textual transformation includes changing an arrangement of at least one of words, sentences, and paragraphs in said textual document.

18. The method of claim 16 wherein said reversing preserves receiving modifications by said writer of said textual document that does not reverse at least a part of said textual transformation.

19. The method of claim 16 wherein said introduced errors into said textual document is based upon either a shallow or deep understanding of a grammatical structure of said textual document.

20. The method of claim 16 wherein said textual transformation includes relocation of a plurality of individual words.

21. The method of claim 16 wherein said textual transformation includes relocation of a plurality of individual letters of individual words.

22. The method of claim 16 wherein said textual transformation includes relocation of a plurality of individual sentences.

23. The method of claim 16 wherein said textual transformation includes relocation of a plurality of individual paragraphs.

24. The method of claim 16 wherein said textual transformation includes modification of formatting.

25. The method of claim 16 wherein said textual transformation includes modification of line breaks.

26. The method of claim 16 wherein said textual transformation includes modification of page breaks.

27. The method of claim 1 6wherein said textual transformation includes modification of spaces.

28. The method of claim 16 wherein said textual transformation includes modification of text format.

29. The method of claim 16 wherein said textual transformation includes changing a spelling of a word from a proper spelling to an improper spelling.

\* \* \* \* \*